(12) United States Patent
Bulusu et al.

(10) Patent No.: US 10,996,893 B2
(45) Date of Patent: May 4, 2021

(54) NON-VOLATILE STORAGE PARTITION IDENTIFIER

(71) Applicant: Microsoft Technology Licensing, LLC, Redmond, WA (US)

(72) Inventors: Mallik Bulusu, Bellevue, WA (US); Tom Long Nguyen, Auburn, WA (US); Ravi Mysore Shantamurthy, Bothell, WA (US); Devendu Sharma, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 16/436,737

(22) Filed: Jun. 10, 2019

(65) Prior Publication Data
US 2020/0387325 A1 Dec. 10, 2020

(51) Int. Cl.
*G06F 3/06* (2006.01)
(52) U.S. Cl.
CPC .......... *G06F 3/0659* (2013.01); *G06F 3/0604* (2013.01); *G06F 3/065* (2013.01);
(Continued)
(58) Field of Classification Search
CPC ...... G06F 3/0659; G06F 3/065; G06F 3/0631; G06F 3/0604; G06F 3/0679;
(Continued)

(56) References Cited

U.S. PATENT DOCUMENTS

2012/0054734 A1* 3/2012 Andrews .................. G06F 8/65
717/171
2015/0128000 A1 5/2015 Jung et al.
(Continued)

FOREIGN PATENT DOCUMENTS

WO 2016209458 A1 12/2016

OTHER PUBLICATIONS

"International Search Report and Written Opinion Issued in PCT Application No. PCT/US2020/030329", dated Jul. 22, 2020, 13 Pages.
(Continued)

*Primary Examiner* — David Yi
*Assistant Examiner* — Zubair Ahmed
(74) *Attorney, Agent, or Firm* — Alleman Hall Creasman & Tuttle LLP (57) ABSTRACT

A computing device including a memory module. The computing device may further include a processor configured to, by executing instructions of an operating system, divide a non-volatile region of the memory module into a first non-volatile storage partition allocated to the operating system and a second non-volatile storage partition allocated to system firmware. The processor may write a globally unique identifier (GUID) to the non-volatile region. The GUID may indicate a location of a boundary between the first non-volatile storage partition and the second non-volatile storage partition. The processor may access the first non-volatile storage partition. By executing instructions of the system firmware, the processor may determine the location of the boundary. The processor may access the second non-volatile storage partition. The operating system may be prevented from accessing the second non-volatile storage partition and the system firmware may be prevented from accessing the first non-volatile storage partition.

20 Claims, 7 Drawing Sheets

(52) U.S. Cl.
CPC .......... *G06F 3/0631* (2013.01); *G06F 3/0644* (2013.01); *G06F 3/0679* (2013.01)

(58) Field of Classification Search
CPC .......... G06F 2212/105; G06F 12/0868; G06F 12/0238; G06F 2212/205; G06F 2212/313; G06F 12/1441; G06F 2212/282; G06F 3/0644; G06F 12/0284; G06F 12/0873; G06F 2212/1032; G06F 2212/7204; G06F 12/1491

USPC ........................................................ 711/103
See application file for complete search history.

(56) References Cited

U.S. PATENT DOCUMENTS

| | | | |
|---|---|---|---|
| 2015/0324283 A1 | 11/2015 | Lai | |
| 2016/0179375 A1 | 6/2016 | Kirvan et al. | |
| 2016/0378976 A1* | 12/2016 | Kotary | G06F 3/0655 713/193 |
| 2019/0129631 A1* | 5/2019 | Lewis | G06F 12/123 |
| 2020/0241747 A1* | 7/2020 | Gupta | G06F 3/0644 |

OTHER PUBLICATIONS

Yoon, "Optimized Memory-Disk Integrated System with DRAM and Nonvolatile Memory", In Proceedings of the IEEE Transactions on Multi-Scale Computing Systems, vol. 2, Issue 2, Apr. 1, 2016, pp. 83-93.

* cited by examiner

NON-VOLATILE STORAGE PARTITION IDENTIFIER

BACKGROUND

Software-defined storage-class memory is a special class of storage device used in some computing devices. During runtime, the software-defined storage-class memory acts as volatile memory. When the computing device is shut down, the software-defined storage-class memory acts as non-volatile memory. This feature of software-defined storage-class memory is made possible through firmware-assisted coupling of volatile memory regions and non-volatile storage partitions.

SUMMARY

According to one aspect of the present disclosure, a computing device is provided, including a memory module. The computing device may further include a processor configured to, by executing instructions of an operating system, divide a non-volatile region of the memory module into a first non-volatile storage partition allocated to the operating system and a second non-volatile storage partition allocated to system firmware. The processor may be further configured to write a globally unique identifier (GUID) to the non-volatile region of the memory module. The GUID may indicate a boundary between the first non-volatile storage partition and the second non-volatile storage partition. The processor may be further configured to access the first non-volatile storage partition by executing instructions of the operating system. By executing instructions of the system firmware, the processor may be further configured to determine the location of the boundary. By executing instructions of the system firmware, the processor may be further configured to access the second non-volatile storage partition in response to determining the location of the boundary. The operating system may be prevented from accessing the second non-volatile storage partition and the system firmware may be prevented from accessing the first non-volatile storage partition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Software-defined storage-class memory, such as a non-volatile dual in-line memory module (NVDIMM) may be used to divide non-volatile storage between an operating system and system firmware, such as Basic Input/Output System (BIOS) or Unified Extensible Firmware Interface (UEFI). When the non-volatile storage is divided between the operating system and system firmware, the operating system and the system firmware may each be assigned a respective partition of the non-volatile storage. The amount of storage allocated to each may be specified by a user, thereby allowing different amounts of storage to be assigned to the operating system and the system firmware in different contexts and use cases.

When new server computing devices are installed in a data center, all storage media included in the new server computing devices are typically formatted as a security measure. Thus, partitions of the storage media are typically deleted when the new server computing devices are installed. When partitions of non-volatile memory specified by software-defined storage-class memory are deleted in this way, the user may have to reallocate the non-volatile storage between the operating system and the system firmware. The user installing a new server computing device may therefore have to spend additional resources to re-partition the non-volatile storage.

Figure 1:
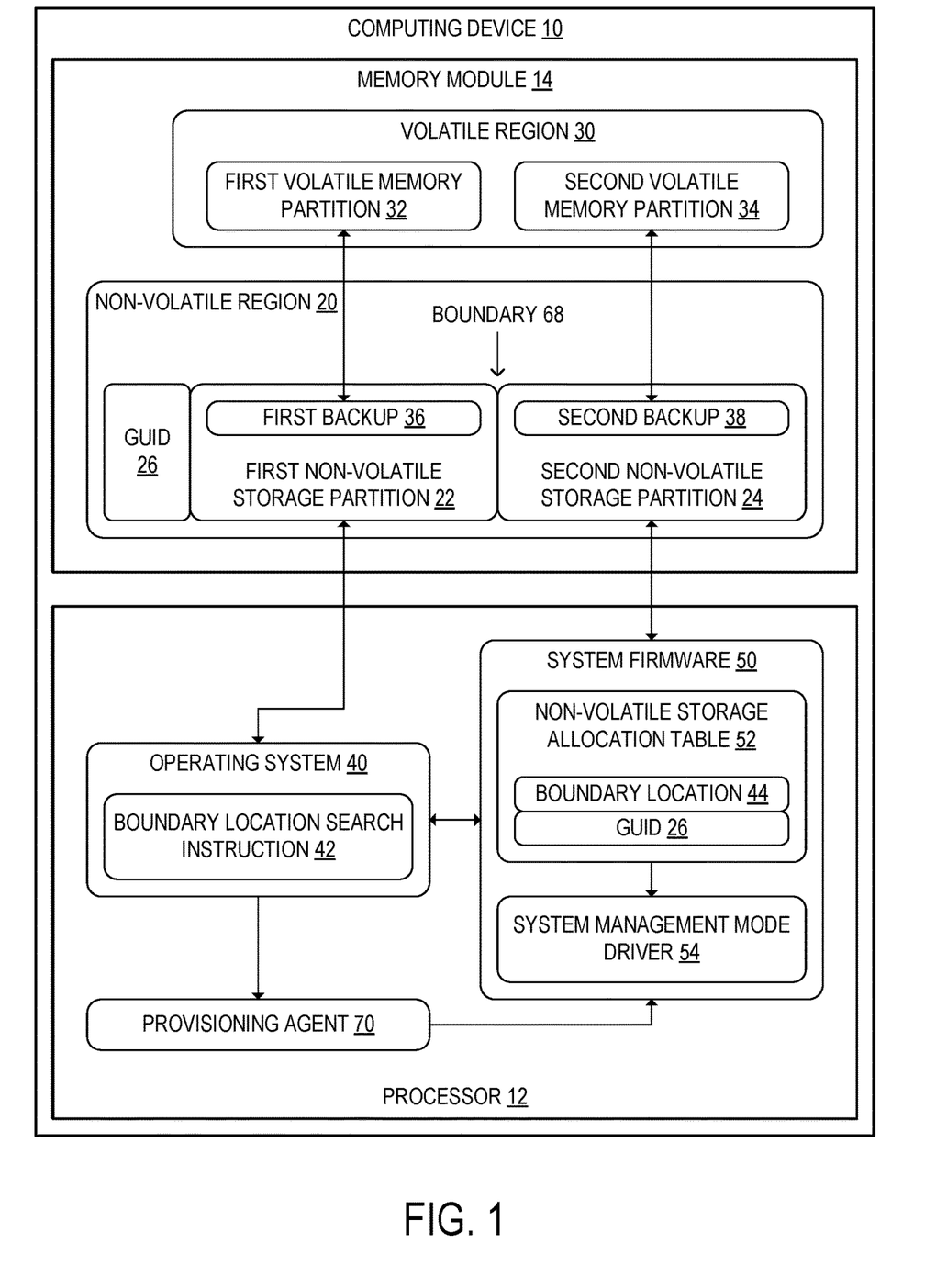
FIG. 1 schematically depicts an example computing device including a memory module and a processor, according to one example embodiment.

In order to address the problems discussed above, a computing device 10 is provided, as schematically depicted in the example embodiment of FIG. 1. The computing device 10 of FIG. 1 may include a processor 12 configured to execute program instructions. The computing device 10 may further include a memory module 14 operatively coupled to the processor 12. The memory module 14 as shown in FIG. 1 is a hardware device which may, for example, be a memory chip coupled to the processor 12 via a motherboard of the computing device 10. The memory module 14 may include a non-volatile region 20 and a volatile region 30.

Figure 2:
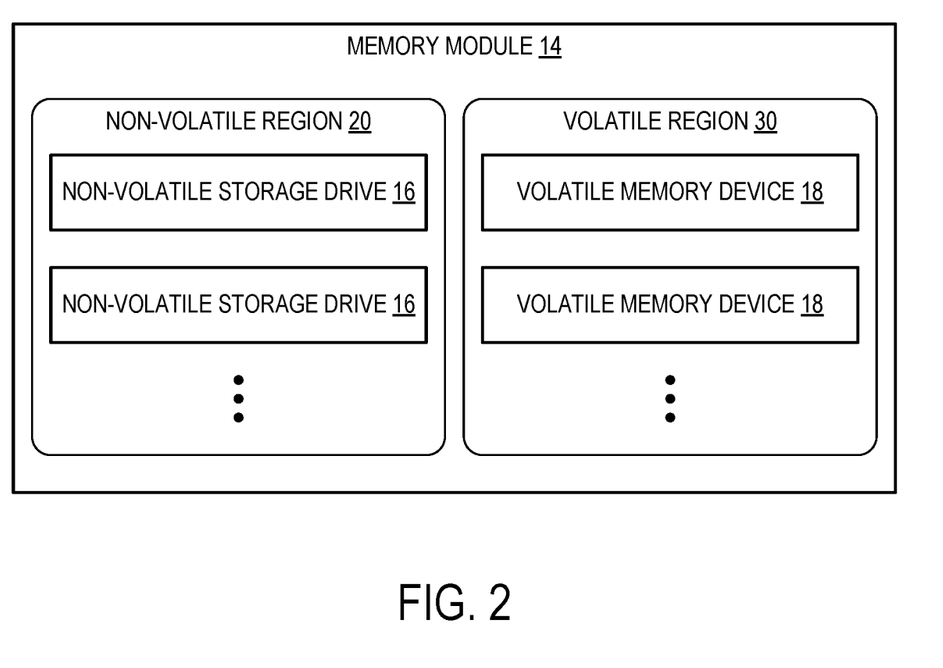
FIG. 2 schematically depicts the memory module of the computing device of FIG. 1.

As shown in the example of FIG. 2, the memory module 14 may include one or more non-volatile storage drives 16 and one or more volatile memory devices 18. For example, the memory module 14 may be a non-volatile dual in-line memory module (NVDIMM). The NVDIMM may include one or more M.2 drives as the one or more non-volatile storage drives 16, such as one or more non-volatile memory express (NVMe) drives. The one or more volatile memory devices 18 may, for example, be dynamic random-access memory (DRAM) devices. Additionally or alternatively, one or more other types of non-volatile storage drive 16 or volatile memory device 18 may be included in the memory module 14, such as a hard disk or flash memory.

Returning to FIG. 1, the processor 12 of the computing device may be configured to execute instructions to run an operating system 40. The processor 12 may be further configured to execute instructions to run system firmware 50. The system firmware 50 may be BIOS or UEFI, as discussed above. By executing instructions of the operating system 40, the processor 12 may be further configured to divide the non-volatile region 20 of the memory module 14 into a first non-volatile storage partition 22 allocated to the operating system 40 and a second non-volatile storage partition 24 allocated to the system firmware 50. In some embodiments, the processor 12 may be configured to divide the non-volatile region into more than two partitions. In such embodiments, the one or more additional partitions beyond the first non-volatile storage partition 22 and the second non-volatile storage partition 24 may each be allocated to the operating system 40, the system firmware 50, or some other process executed on the processor 12. The processor 12 may, in such embodiments, be further configured to run a plurality of operating systems 40. A respective partition may be allocated to each operating system 40 of the plurality of operating systems 40.

By executing instructions of the operating system 40, the processor 12 may be further configured to write a globally unique identifier (GUID) 26 to the non-volatile region 20 of the memory module 14. The GUID 26 may indicate a location 44 of a boundary 68 between the first non-volatile storage partition 22 and the second non-volatile storage partition 24. In some embodiments, the GUID 26 may be written to a GUID partition table (GPT) of the non-volatile region 20. In other embodiments, the GUID 26 may be written to some other portion of the non-volatile region 20, as discussed in further detail below.

Figure 3:
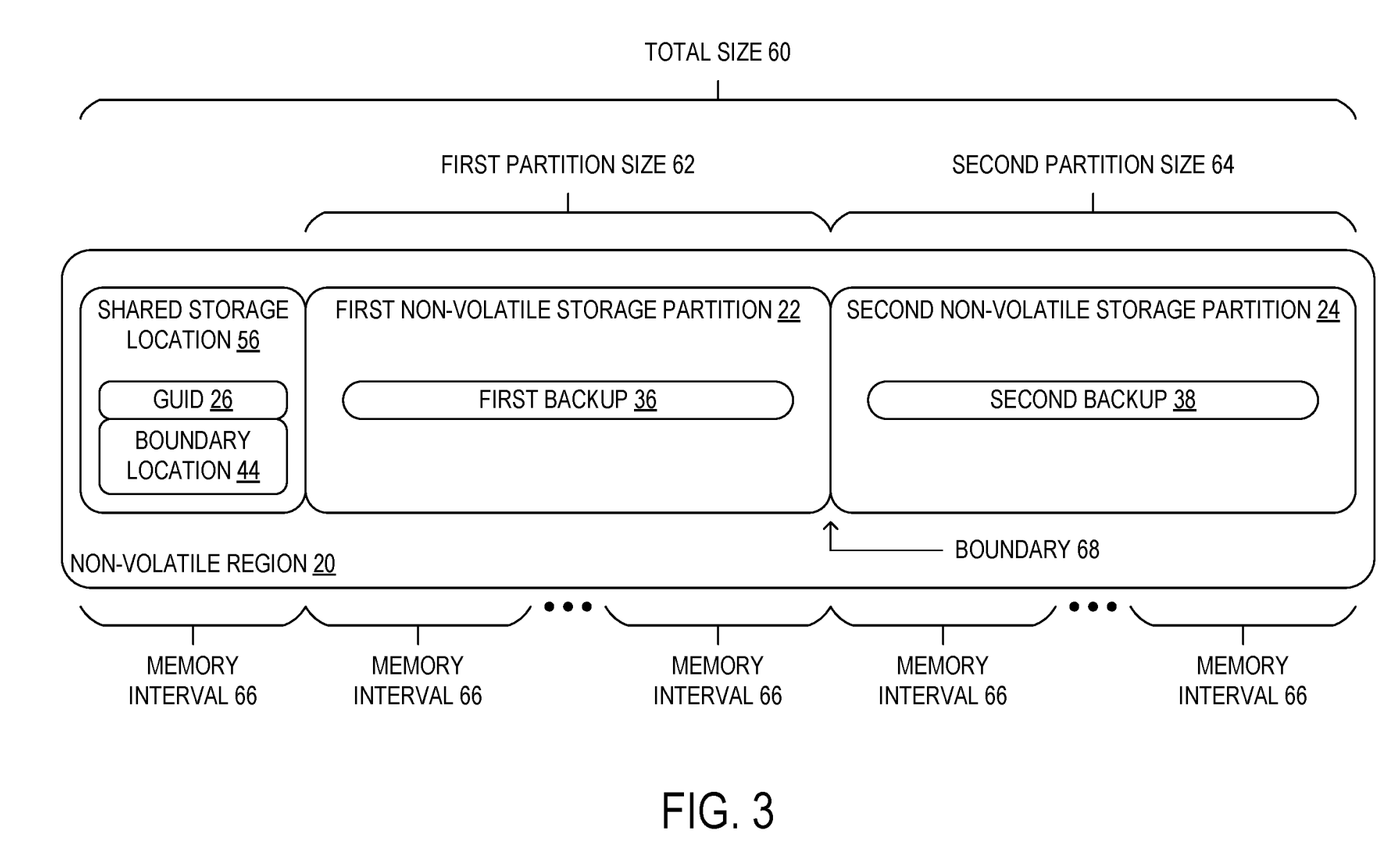
FIG. 3 schematically depicts a non-volatile region of the memory module of FIG. 1.

FIG. 3 shows the non-volatile region 20 of the memory module 14 in further detail, according to one example embodiment. In the example of FIG. 3, the GUID 26 is written to a shared storage region 56, which may be accessible by both the operating system 40 and the system firmware 50. FIG. 3 also shows a boundary 68 between the first non-volatile storage partition 22 and the second non-volatile storage partition 24. In addition to the GUID 26, the shared storage location 56 may indicate the location 44 of the boundary 68.

FIG. 3 also shows a plurality of memory intervals 66 into which the non-volatile region 20 is divided. The processor 12 may be further configured to divide the non-volatile region 20 such that the boundary 68 between the first non-volatile storage partition 22 and the second non-volatile storage partition 24 is aligned with a memory interval 66 of the plurality of memory intervals 66. Each memory interval 66 may have a predetermined length. For example, each memory interval 66 may be 4 kB in length. In other embodiments, each memory interval 66 may have some other predetermined length, such as 2 kB or 8 kB.

In some embodiments, the processor 12 may be further configured to determine a first partition size 62 of the first non-volatile storage partition 22 and a second partition size 64 of the second non-volatile storage partition 24 based at least in part on a total size 60 of the non-volatile region 20 and a number of non-volatile storage drives 16 included in the memory module 14. For example, the processor 12 may be configured to set the first partition size 62 to the total size 60 of the non-volatile region 20 divided by the number of non-volatile storage drives 16, rounded up to the nearest gigabyte. Alternatively, the first partition size 62 may be rounded down or rounded to some other size interval. The first partition size 62 and the second partition size 64 may be determined at the operating system 40. In some embodiments, the processor 12 may be configured to receive the total size 60 and the number of non-volatile storage drives 16 at the operating system 40 from the system firmware 50.

Returning to FIG. 1, the processor 12 may be configured to divide the non-volatile region 20 of the memory module 14 at least in part by generating a non-volatile storage allocation table 52 indicating the GUID 26 and the location 44 of the boundary 68. In some embodiments, the non-volatile storage allocation table 52 may be a GPT. The non-volatile storage allocation table 52 may be generated by executing instructions of the system firmware 50. In embodiments in which the non-volatile region 20 of the memory module 14 is divided into more than two partitions, the non-volatile storage allocation table 52 may indicate a plurality of GUIDs and a corresponding plurality of locations 44 of boundaries 68 between the partitions.

In embodiments in which a non-volatile storage allocation table 52 is generated, the processor 12 may be further configured to, by executing instructions of the system firmware 50, transmit the non-volatile storage allocation table 52 to a system management mode driver 54. The system management mode driver 54 may be included in the system firmware 50. The system management mode driver 54 may operate in system management mode, which may be the highest level of administrative privileges on the computing device 10. By executing instructions of the system management mode driver 54, the processor 12 may be further configured to transmit the non-volatile storage allocation table 52 to the operating system 40. In some embodiments, the system management mode driver 54 may transmit the non-volatile storage allocation table 52 to the operating system 40 by writing the non-volatile storage allocation table 52 to the shared storage location 56. The processor 12 may then execute instructions of the operating system 40 to retrieve the non-volatile storage allocation table 52.

In some embodiments, the processor 12 may be further configured to execute instructions of a provisioning agent 70. The provisioning agent 70 may be a program launched by the processor 12 to create the first non-volatile storage partition 22 and the second non-volatile storage partition 24 after the GUID 26 has been written to the non-volatile region 20. In some embodiments, the provisioning agent 70 may be a software stack executed outside the system firmware 50. The provisioning agent 70 may, for example, be run during a boot flow in which the computing device 10 is prepared for use as a server computing device in a cloud computing environment.

After the non-volatile region 20 has been divided into the first non-volatile storage partition 22 and the second non-volatile storage partition 24, the processor 12 may be further configured to, by executing instructions of the operating system 40, access the first non-volatile storage partition 22 at the operating system 40. The operating system 40 may be prevented from accessing the second non-volatile storage partition 24. In some embodiments, the processor 12 may be configured to determine which portions of the non-volatile region 20 are accessible to the operating system 40 and which portions are inaccessible to the operating system 40 at least in part by accessing the non-volatile storage allocation table 52.

By executing instructions of the system firmware 50, the processor 12 may be further configured to determine the location 44 of the boundary 68 after the non-volatile region 20 has been divided into the first non-volatile storage partition 22 and the second non-volatile storage partition 24 and the GUID 26 has been written to the non-volatile region 20. In some embodiments, executing instructions of the system firmware 50 to determine the location 44 of the boundary 68 may include querying the non-volatile storage allocation table 52. The processor 12 may be further configured to access the second non-volatile storage partition 24 in response to determining the location 44 of the boundary

68. The system firmware 50 may be prevented from accessing the first non-volatile storage partition 22. Thus, the non-volatile region 20 may be divided into a first non-volatile storage partition 22 that is accessible by the operating system 40 but not the system firmware 50 and a second non-volatile storage partition 24 that is accessible by the system firmware 50 but not the operating system 40.

In some embodiments, by executing instructions of the system firmware 50, the processor 12 may be configured to determine the location 44 of the boundary 68 subsequently to a reboot of the computing device 10 after the GUID 26 has been written to the non-volatile region 20. Additionally or alternatively, by executing instructions of the system firmware 50, the processor 12 may be further configured to determine the location 44 of the boundary 68 in response to receiving a boundary location search instruction 42 from the operating system 40.

Figure 4:
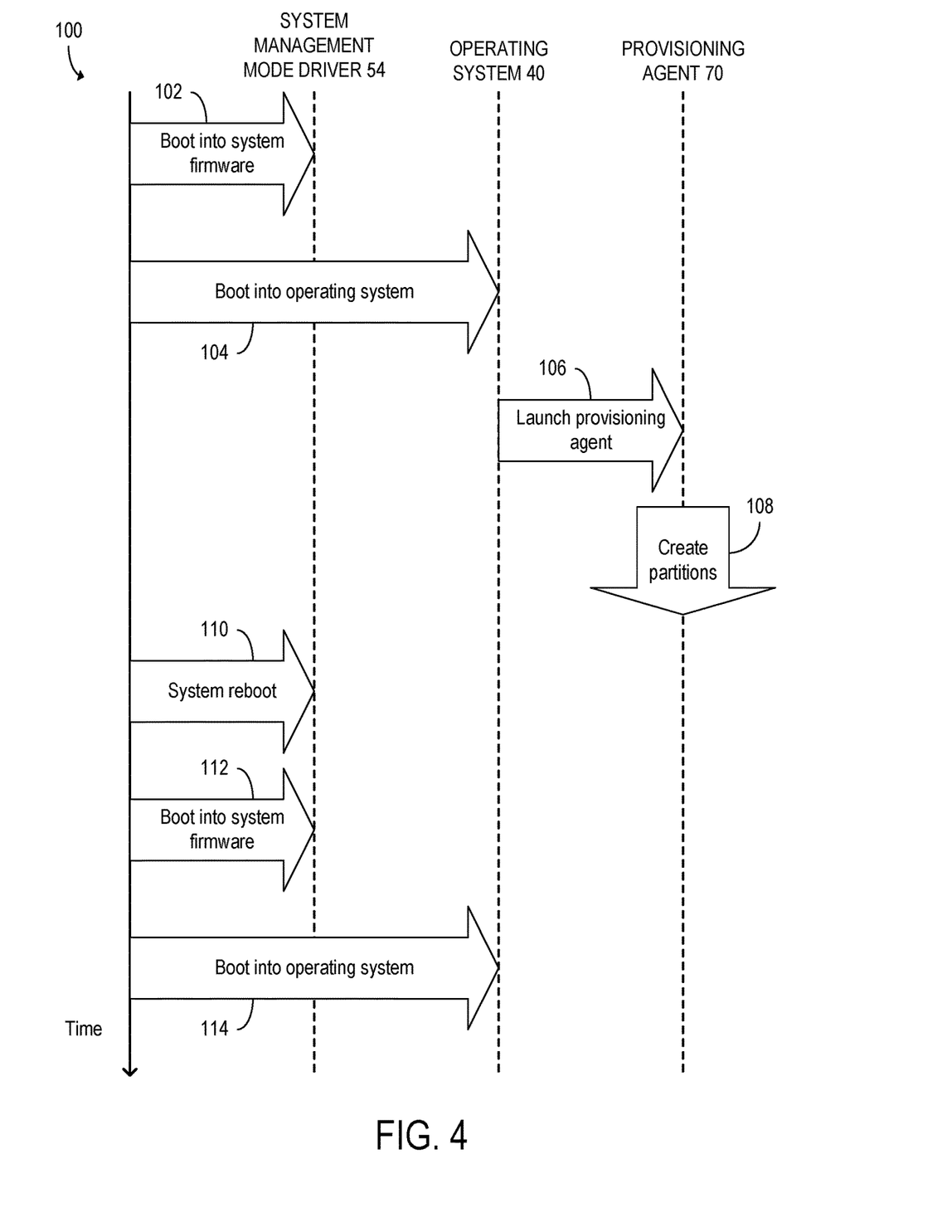
FIG. 4 shows an example timeline of steps that may be performed when dividing the non-volatile region of the memory module, according to the embodiment of FIG. 1.

FIG. 4 shows an example timeline 100 of steps the processor 12 may perform by executing instructions of the system management mode driver 54, operating system 40, and provisioning agent 70 during provisioning of the non-volatile region 20, according to one example embodiment. At step 102, the processor 12 may be configured to boot into the system firmware 50. In the system firmware 50, the processor 12 may be configured to designate one or more non-volatile storage drives 16 as being included in the non-volatile region 20. At step 104, the processor 12 may be further configured to boot into the operating system 40. From the operating system 40, the processor 12 may be further configured to launch the provisioning agent 70 at step 106. For example, the processor 12 may launch the provisioning agent 70 in response to instructions received at the operating system 40 from a user, for example, at a graphical user interface.

At step 108, by executing instructions of the provisioning agent 70, the processor 12 may be further configured to create the first non-volatile storage partition 22 and the second non-volatile storage partition 24. In some embodiments, the processor 12 may be further configured to generate one or more additional partitions by executing instructions of the provisioning agent. After the first non-volatile storage partition 22 and the second non-volatile storage partition 24 have been created, the processor 12 may be further configured to perform a system reboot at step 110. When the processor 12 performs the system reboot, the processor 12 may be further configured to boot into the system firmware 50 again at step 112. The processor 12 may be further configured to determine the location 44 of the boundary 68 by executing instructions of the system firmware 50, as described above. At step 114, the processor 12 may be further configured to boot into the operating system 40. When the processor 12 boots into the operating system 40 at step 114, the processor 12 may be configured to access the first non-volatile storage partition 22.

Returning to FIG. 1, a volatile region 30 of the memory module 14 is shown. The volatile region 30 may include a first volatile memory partition 32 and a second volatile memory partition 34 of the one or more volatile memory devices 18. In some embodiments, the processor 12 may be further configured to store a first backup 36 of the first volatile memory partition 32 in the first non-volatile storage partition 22. Additionally or alternatively, the processor 12 may be further configured to store a second backup 38 of the second volatile memory partition 34 in the second non-volatile storage partition 24. Thus, the non-volatile region 20 of the memory module 14 may back up at least a portion of the data stored in the volatile region 30 such that the backed-up data persists across system reboots.

In embodiments in which the non-volatile region 20 stores at least one of a first backup 36 of the first volatile memory partition 32 or a second backup 38 of the second volatile memory partition 34, the processor 12 may be further configured to determine that the first volatile memory partition 32 or the second volatile memory partition 34 has been erased. For example, the processor 12 may make this determination after a system reboot. In response to making this determination, the processor 12 may be further configured to restore the erased volatile memory partition from the respective backup of that volatile memory partition. Thus, when the processor 12 determines that the first volatile memory partition 32 has been erased, the processor 12 may be further configured to load the first backup 36 into the volatile memory region 30. Similarly, when the processor 12 determines that the second volatile memory partition 34 has been erased, the processor 12 may be further configured to load the second backup 38 into the volatile memory region 30. When a volatile memory partition is restored from a backup, the processor 12 may write the backup to the volatile memory region 30 at a location at which the volatile memory partition was located prior to being erased.

Figure 5:
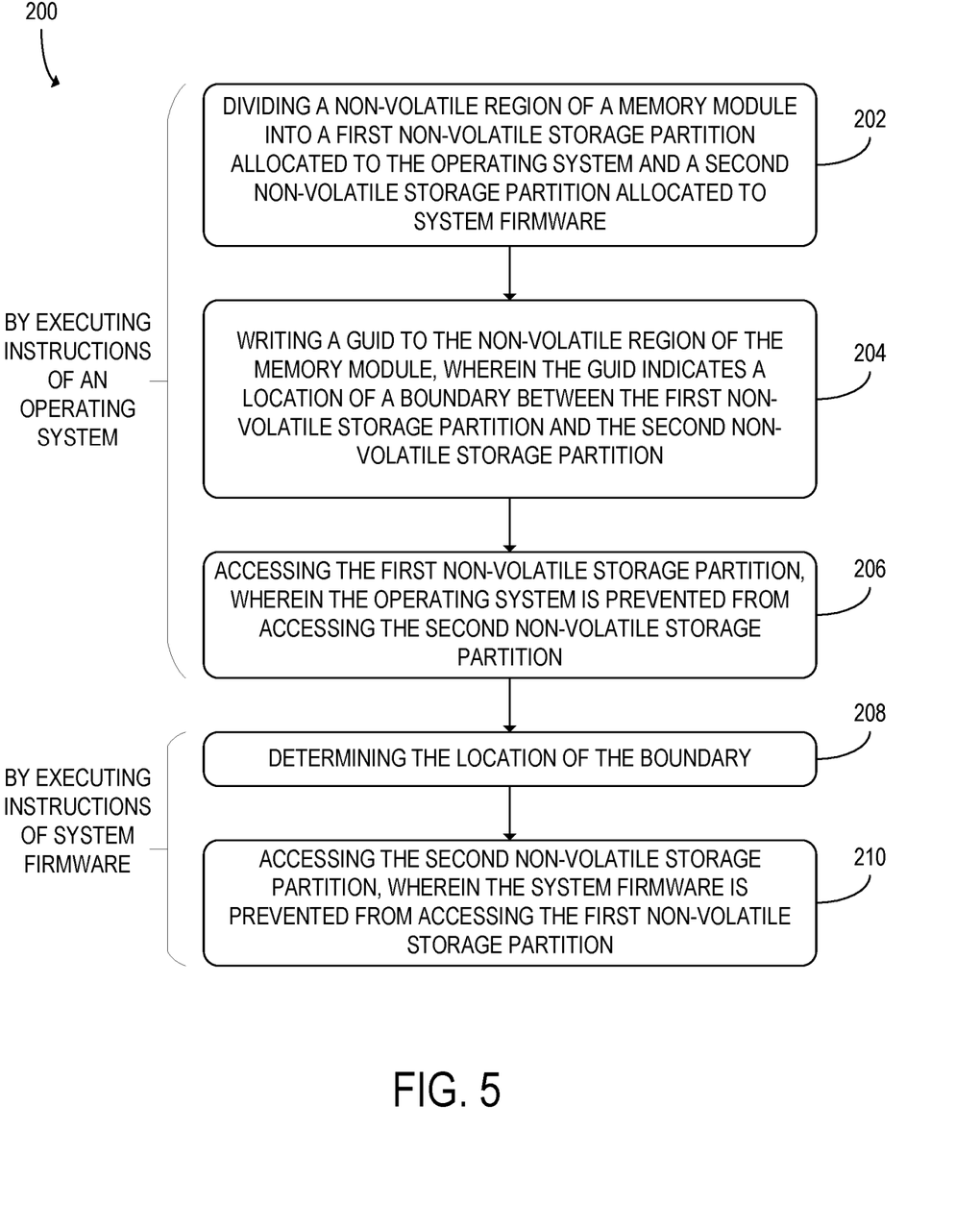
FIG. 5 shows a flowchart of an example method that may be performed at a computing device, according to the embodiment of FIG. 1.

FIG. 5 shows a flowchart of an example method 200 for use with a computing device to partition a non-volatile region of a memory module. The computing device with which the method 200 of FIG. 5 is used may be the computing device 10 of FIG. 1 or some other computing device. At step 202, the method 200 may include dividing a non-volatile region of a memory module into a first non-volatile storage partition allocated to the operating system and a second non-volatile storage partition allocated to system firmware. The memory module may be an NVDIMM, for example. Step 202 may be performed by executing instructions of an operating system of the computing device at which the method 200 is performed.

At step 204, the method 200 may further include writing a GUID to the non-volatile region of the memory module. The GUID may indicate a location of a boundary between the first non-volatile storage partition and the second non-volatile storage partition. Step 204 may be performed by executing instructions of the operating system. At step 206, the method 200 may further include, by executing instructions of the operating system, accessing the first non-volatile storage partition. The first non-volatile storage partition may be accessed after booting into the operating system. The operating system may be prevented from accessing the second non-volatile storage partition.

Step 208 of the method 200 may be performed by executing instructions of system firmware of the computing device. At step 208, the method 200 may further include determining the location of the boundary in the non-volatile region of the memory module. In some embodiments, by executing instructions of the system firmware, the location of the boundary may be determined subsequently to a reboot of the computing device after the GUID has been written to the non-volatile region. Additionally or alternatively, by executing instructions of the system firmware, the location of the boundary in the non-volatile region may be determined in response to receiving a boundary location search instruction from the operating system.

At step 210, the method 200 may further include, by executing instructions of the system firmware, accessing the second non-volatile storage partition in response to determining the location of the boundary. The system firmware may be prevented from accessing the first non-volatile storage partition. Thus, the first non-volatile storage partition may be allocated to the operating system and the second non-volatile storage partition may be allocated to the system firmware.

In some embodiments, the non-volatile region of the memory module may be divided into more than two partitions. In such embodiments, each additional non-volatile storage partition beyond the first non-volatile storage partition and the second non-volatile storage partition may be allocated to the operating system or the system firmware. In some embodiments, a plurality of operating systems may be run on the computing device. Each operating system of the plurality of operating systems may, in such embodiments, be allocated a non-volatile storage partition.

Figure 6:
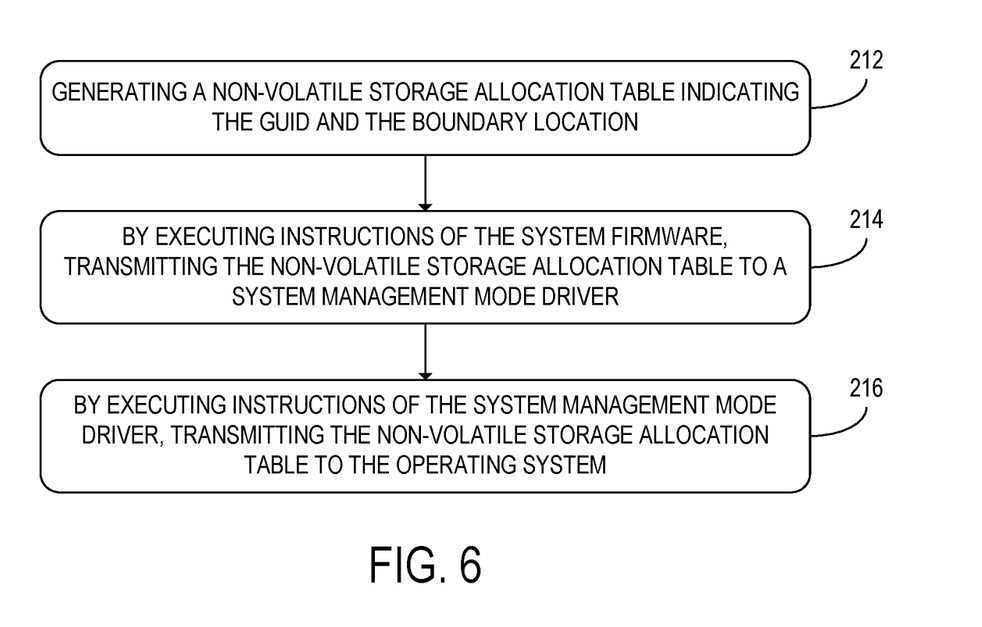
FIG. 6 shows additional steps of the method of FIG. 5 that may be performed in some embodiments.

FIG. 6 shows additional steps of the method 200 that may be executed in some embodiments. At step 212, the method 200 may further include generating a non-volatile storage allocation table indicating the GUID and the location of the boundary. Step 212 may be performed as part of dividing the non-volatile region of the memory module at step 202. The non-volatile storage allocation table may, in some embodiments, be stored in a shared storage location included in the non-volatile region of the memory module. In embodiments in which step 212 is performed, the method 200 may further include, at step 214, transmitting the non-volatile storage allocation table to a system management mode driver. The non-volatile storage allocation table may be transmitted to the system management mode driver by executing instructions of the system firmware. At step 216, the method 200 may further include, by executing instructions of the system management mode driver, transmitting the non-volatile storage allocation table to the operating system.

Figure 7:
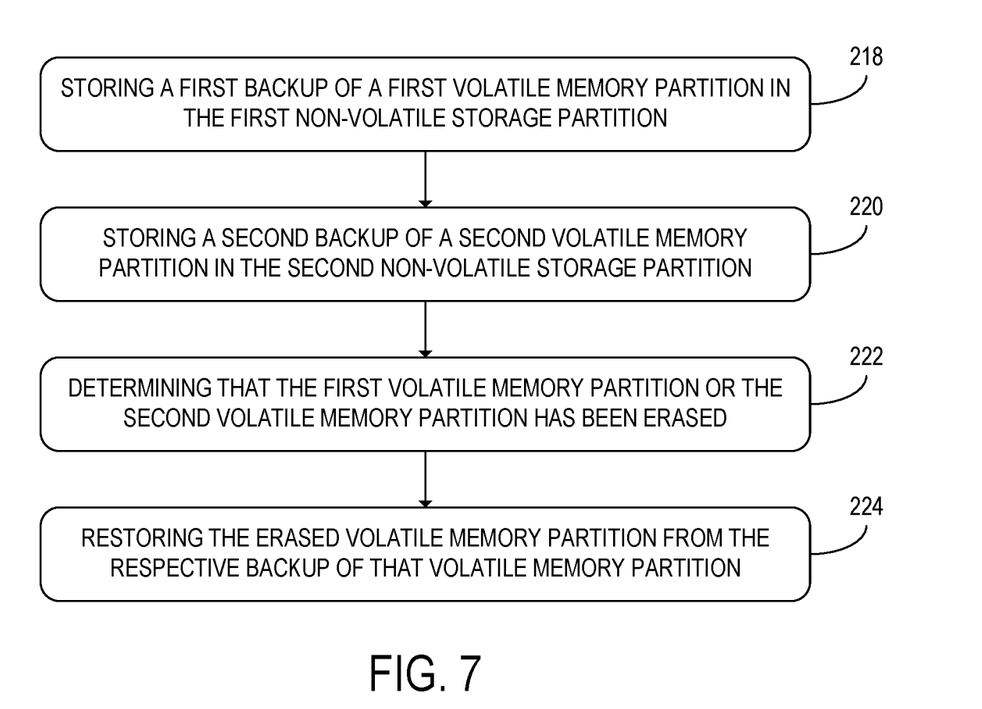
FIG. 7 shows additional steps of the method of FIG. 5 that may be performed in some embodiments when the memory module includes a volatile region.

FIG. 7 also shows additional steps of the method 200 that may be executed in some embodiments. The steps of FIG. 7 may be performed in embodiments in which the memory module further includes a volatile region, and in which the volatile region includes a first volatile memory partition and a second volatile memory partition of one or more volatile memory devices. At step 218, the method 200 may further include storing a first backup of the first volatile memory partition in the first non-volatile storage partition. Additionally or alternatively, at step 220, the method 200 may further include storing a second backup of the second volatile memory partition in the second non-volatile storage partition. In some embodiments, the volatile region of the memory module may include more than two partitions. In such embodiments, when the non-volatile region includes more than two non-volatile storage partitions, each volatile memory partition may be backed up on a corresponding non-volatile storage partition. Alternatively, one or more of the non-volatile storage partitions may store respective backups of a plurality of volatile memory partitions.

At step 222, the method 200 may further include determining that the first volatile memory partition or the second volatile memory partition has been erased. For example, the volatile region may be erased during a system reboot. In response to this determination, the method 200 may further include, at step 224, restoring the erased volatile memory partition from the respective backup of that volatile memory partition. Thus, data stored in the volatile region may be backed up in the non-volatile region and may be restored from backup after at least a portion of the volatile region is erased.

Using the devices and methods described above, the non-volatile region of the memory module may be partitioned between the operating system and system firmware of a computing device. When the computing device is a server computing device in the process of being installed in a data center, typically, the drives are reformatted prior to installation for security reasons, which has the effect of deleting any partition that was installed prior to that point. During the provisioning process, the systems and methods herein enable a component of the BIOS such as a driver for non-volatile memory (i.e., NVDIMM memory) to scan for a non-volatile memory partition. If none is found, which will be true after the drives are reformatted for security reasons, then the operating system creates a GUIDed partition for the non-volatile memory using an NVDIMM-specific GUID generated by the operating system, and stores this in a suitable location as described above. The server computing device may then be rebooted, and during the subsequent boot-up process the driver for the NVDIMM memory will scan for partitions, and find the GUIDed partition that was written by the operating system, and may send an arm operation to the NVDIMM to enable save operations to commence on the NVDIMM partitioned according to the GUIDed partition definition. In this way, the operating system may be used to partition non-volatile memory in an NVDIMM, for example, during server provisioning. Using this approach, the user installing the server computing device may avoid having to re-partition the memory module after installation, manually. In addition, using the devices and methods described above, the user may, at the operating system, select where the non-volatile storage partitions are created in the non-volatile region, enabling highly flexible and case-specific partitioning by users.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
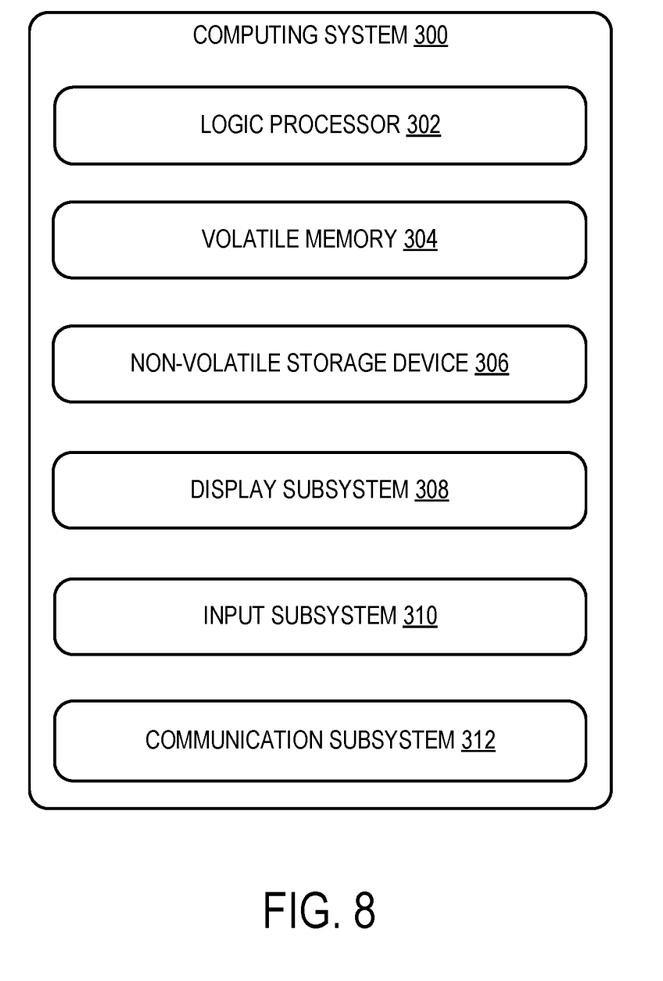
FIG. 8 shows a schematic view of an example computing environment in which the computer device of FIG. 1 may be enacted.

FIG. 8 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 8.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

According to one aspect of the present disclosure, a computing device is provided, including a memory module and a processor. The processor may be configured to, by executing instructions of an operating system, divide a non-volatile region of the memory module into a first non-volatile storage partition allocated to the operating system and a second non-volatile storage partition allocated to system firmware. The processor may be further configured to write a globally unique identifier (GUID) to the non-volatile region of the memory module. The GUID may indicate a location of a boundary between the first non-volatile storage partition and the second non-volatile storage partition. The processor may be further configured to access the first non-volatile storage partition. By executing instructions of the system firmware, the processor may be further configured to determine the location of the boundary. The processor may be further configured to access the second non-volatile storage partition in response to determining the location of the boundary. The operating system may be prevented from accessing the second non-volatile storage partition and the system firmware may be prevented from accessing the first non-volatile storage partition.

According to this aspect, the memory module may be a non-volatile dual in-line memory module (NVDIMM).

According to this aspect, the processor may be configured to divide the non-volatile region of the memory module at least in part by generating a non-volatile storage allocation table including the GUID and the location of the boundary.

According to this aspect, the processor may be further configured to, by executing instructions of the system firmware, transmit the non-volatile storage allocation table to a system management mode driver. By executing instructions of the system management mode driver, the processor may be further configured to transmit the non-volatile storage allocation table to the operating system.

According to this aspect, by executing instructions of the system firmware, the processor may be configured to determine the location of the boundary subsequently to a reboot of the computing device after the GUID has been written to the non-volatile region.

According to this aspect, by executing instructions of the system firmware, the processor may be configured to determine the location of the boundary in response to receiving a boundary location search instruction from the operating system.

According to this aspect, the processor may be configured to divide the non-volatile region such that the boundary between the first non-volatile storage partition and the second non-volatile storage partition is aligned with a memory interval of a plurality of memory intervals each having a predetermined length.

According to this aspect, the memory module may further include a volatile region including a first volatile memory partition and a second volatile memory partition of one or more volatile memory devices.

According to this aspect, the processor may be further configured to store a first backup of the first volatile memory partition in the first non-volatile storage partition and store a second backup of the second volatile memory partition in the second non-volatile storage partition.

According to this aspect, the processor may be further configured to determine that the first volatile memory partition or the second volatile memory partition has been erased. The processor may be further configured to restore the erased volatile memory partition from the respective backup of that volatile memory partition.

According to this aspect, the processor may be further configured to determine a first partition size of the first non-volatile storage partition and a second partition size of the second non-volatile storage partition based at least in part on a total size of the non-volatile region and a number of non-volatile storage drives included in the memory module.

According to another aspect of the present disclosure, a method for use with a computing device is provided. The method may include, by executing instructions of an operating system, dividing a non-volatile region of a memory module into a first non-volatile storage partition allocated to the operating system and a second non-volatile storage partition allocated to system firmware. The method may further include writing a globally unique identifier (GUID) to the non-volatile region of the memory module. The GUID indicates a location of a boundary between the first non-volatile storage partition and the second non-volatile storage partition. The method may further include accessing the first non-volatile storage partition. The method may further include, by executing instructions of system firmware, determining the location of the boundary. The method may further include accessing the second non-volatile storage partition in response to determining the location of the boundary. The operating system may be prevented from accessing the second non-volatile storage partition and the system firmware may be prevented from accessing the first non-volatile storage partition.

According to this aspect, the memory module may be a non-volatile dual in-line memory module (NVDIMM).

According to this aspect, dividing the non-volatile region of the memory module may include generating a non-volatile storage allocation table indicating the GUID and the location of the boundary.

According to this aspect, the method may further include, by executing instructions of the system firmware, transmitting the non-volatile storage allocation table to a system management mode driver. The method may further include, by executing instructions of the system management mode driver, transmitting the non-volatile storage allocation table to the operating system.

According to this aspect, by executing instructions of the system firmware, the location of the boundary may be determined subsequently to a reboot of the computing device after the GUID has been written to the non-volatile region.

According to this aspect, the non-volatile region may be divided such that the boundary between the first non-volatile storage partition and the second non-volatile storage partition is aligned with a memory interval of a plurality of memory intervals each having a predetermined length.

According to this aspect, the memory module may further include a volatile region including a first volatile memory partition and a second volatile memory partition of one or more volatile memory devices. The method may further include storing a first backup of the first volatile memory partition in the first non-volatile storage partition. The method may further include storing a second backup of the second volatile memory partition in the second non-volatile storage partition.

According to this aspect, the method may further include determining that the first volatile memory partition or the second volatile memory partition has been erased. The method may further include restoring the erased volatile memory partition from the respective backup of that volatile memory partition.

According to another aspect of the present disclosure, a computing device is provided, including a non-volatile dual in-line memory module (NVDIMM) and a processor. The processor may be configured to, by executing instructions of an operating system, divide a non-volatile region of the NVDIMM into a first non-volatile storage partition allocated to the operating system and a second non-volatile storage partition allocated to system firmware. The processor may be further configured to write a globally unique identifier (GUID) to the non-volatile region of the NVDIMM. The GUID may indicate a location of a boundary between the first non-volatile storage partition and the second non-volatile storage partition. The processor may be further configured to access the first non-volatile storage partition. The processor may be further configured to, by executing instructions of the system firmware, subsequently to a reboot of the computing device after the GUID has been written to the non-volatile region, determine the location of the boundary. The processor may be further configured to access the second non-volatile storage partition in response to determining the location of the boundary. The operating system may be prevented from accessing the second non-volatile storage partition and the system firmware may be prevented from accessing the first non-volatile storage partition.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a memory module; and
   a processor configured to:
      by executing instructions of an operating system during a first boot of the computing device:
         divide a non-volatile region of the memory module into a first non-volatile storage partition allocated to the operating system and a second non-volatile storage partition allocated to system firmware;
         write a globally unique identifier (GUID) to the non-volatile region of the memory module, wherein the GUID indicates a location of a boundary between the first non-volatile storage partition and the second non-volatile storage partition; and
         access the first non-volatile storage partition; and
      by executing instructions of the system firmware during a second boot of the computing device:
         determine the location of the boundary; and
         access the second non-volatile storage partition based on the location of the boundary in the non-volatile region in response to the system firmware determining the location of the boundary, wherein the operating system is prevented from accessing the second non-volatile storage partition and the system firmware is prevented from accessing the first non-volatile storage partition.

2. The computing device of claim 1, wherein the memory module is a non-volatile dual in-line memory module (NVDIMM).

3. The computing device of claim 1, wherein the processor is configured to divide the non-volatile region of the memory module at least in part by generating a non-volatile storage allocation table including the GUID and the location of the boundary.

4. The computing device of claim 3, wherein the processor is further configured to:
   by executing instructions of the system firmware, transmit the non-volatile storage allocation table to a system management mode driver included in the system firmware; and
   by executing instructions of the system management mode driver, transmit the non-volatile storage allocation table to the operating system.

5. The computing device of claim 1, wherein, by executing instructions of the system firmware, the processor is configured to determine the location of the boundary subsequently to a reboot of the computing device after the GUID has been written to the non-volatile region.

6. The computing device of claim 1, wherein, by executing instructions of the system firmware, the processor is configured to determine the location of the boundary in response to receiving a boundary location search instruction from the operating system.

7. The computing device of claim 1, wherein the processor is configured to divide the non-volatile region such that the boundary between the first non-volatile storage partition and the second non-volatile storage partition is aligned with a memory interval of a plurality of memory intervals each having a predetermined length.

8. The computing device of claim 1, wherein the memory module further includes a volatile region including a first volatile memory partition and a second volatile memory partition of one or more volatile memory devices.

9. The computing device of claim 8, wherein the processor is further configured to:
   store a first backup of the first volatile memory partition in the first non-volatile storage partition; and
   store a second backup of the second volatile memory partition in the second non-volatile storage partition.

10. The computing device of claim 9, wherein the processor is further configured to:
    determine that the first volatile memory partition or the second volatile memory partition has been erased; and
    restore the erased volatile memory partition from the respective backup of that volatile memory partition.

11. The computing device of claim 1, wherein the processor is further configured to determine a first partition size of the first non-volatile storage partition and a second partition size of the second non-volatile storage partition based at least in part on a total size of the non-volatile region and a number of non-volatile storage drives included in the memory module.

12. A method for use with a computing device, the method comprising:
    by executing instructions of an operating system during a first boot of the computing device:
       dividing a non-volatile region of a memory module into a first non-volatile storage partition allocated to the operating system and a second non-volatile storage partition allocated to system firmware;
       writing a globally unique identifier (GUID) to the non-volatile region of the memory module, wherein the GUID indicates a location of a boundary between the first non-volatile storage partition and the second non-volatile storage partition; and
       accessing the first non-volatile storage partition; and
    by executing instructions of system firmware during a second boot of the computing device:
       determining the location of the boundary; and
       accessing the second non-volatile storage partition based on the location of the boundary in the non-volatile region in response to the system firmware determining the location of the boundary, wherein the operating system is prevented from accessing the second non-volatile storage partition and the system firmware is prevented from accessing the first non-volatile storage partition.

13. The method of claim 12, wherein the memory module is a non-volatile dual in-line memory module (NVDIMM).

14. The method of claim 12, wherein dividing the non-volatile region of the memory module includes generating a non-volatile storage allocation table indicating the GUID and the location of the boundary.

15. The method of claim 14, further comprising:
by executing instructions of the system firmware, transmitting the non-volatile storage allocation table to a system management mode driver included in the system firmware; and
by executing instructions of the system management mode driver, transmitting the non-volatile storage allocation table to the operating system.

16. The method of claim 12, wherein, by executing instructions of the system firmware, the location of the boundary is determined subsequently to a reboot of the computing device after the GUID has been written to the non-volatile region.

17. The method of claim 12, wherein the non-volatile region is divided such that the boundary between the first non-volatile storage partition and the second non-volatile storage partition is aligned with a memory interval of a plurality of memory intervals each having a predetermined length.

18. The method of claim 12, wherein the memory module further includes a volatile region including a first volatile memory partition and a second volatile memory partition of one or more volatile memory devices, the method further comprising:
storing a first backup of the first volatile memory partition in the first non-volatile storage partition; and
storing a second backup of the second volatile memory partition in the second non-volatile storage partition.

19. The method of claim 18, further comprising:
determining that the first volatile memory partition or the second volatile memory partition has been erased; and
restoring the erased volatile memory partition from the respective backup of that volatile memory partition.

20. A computing device comprising:
a non-volatile dual in-line memory module (NVDIMM); and
a processor configured to:
by executing instructions of an operating system during a first boot of the computing device:
divide a non-volatile region of the NVDIMM into a first non-volatile storage partition allocated to the operating system and a second non-volatile storage partition allocated to system firmware;
write a globally unique identifier (GUID) to the non-volatile region of the NVDIMM, wherein the GUID indicates a location of a boundary between the first non-volatile storage partition and the second non-volatile storage partition; and
access the first non-volatile storage partition; and
by executing instructions of the system firmware during a second boot of the computing device, subsequently to a reboot of the computing device after the GUID has been written to the non-volatile region:
determine the location of the boundary; and
access the second non-volatile storage partition based on the location of the boundary in the non-volatile region in response to the system firmware determining the location of the boundary, wherein the operating system is prevented from accessing the second non-volatile storage partition and the system firmware is prevented from accessing the first non-volatile storage partition.

\* \* \* \* \*